US008516197B2

(12) United States Patent
Eichenberger et al.

(10) Patent No.: US 8,516,197 B2
(45) Date of Patent: Aug. 20, 2013

(54) WRITE-THROUGH CACHE OPTIMIZED FOR DEPENDENCE-FREE PARALLEL REGIONS

(75) Inventors: Alexandre E. Eichenberger, Chappaqua, NY (US); Alan G. Gara, Mount Kisco, NY (US); Martin Ohmacht, Yorktown Heights, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/025,706

(22) Filed: Feb. 11, 2011

(65) Prior Publication Data

US 2012/0210073 A1 Aug. 16, 2012

(51) Int. Cl.
*G06F 12/00* (2006.01)

(52) U.S. Cl.
USPC ............... 711/130; 711/141; 711/E12.026; 711/E12.038

(58) Field of Classification Search
USPC ................................... 711/130, 141
See application file for complete search history.

(56) References Cited

U.S. PATENT DOCUMENTS

| 4,484,267 | A | * | 11/1984 | Fletcher | 711/124 |
| 5,822,763 | A | * | 10/1998 | Baylor et al. | 711/141 |
| 6,457,107 | B1 | | 9/2002 | Wynn et al. | |
| 2005/0154839 | A1 | * | 7/2005 | DeWitt et al. | 711/144 |
| 2009/0113404 | A1 | | 4/2009 | Takayama et al. | |
| 2010/0180085 | A1 | * | 7/2010 | Dave et al. | 711/146 |

OTHER PUBLICATIONS

Atkinson, et al., "The Dragon Processor", In Proceedings of the second international conference on Architectual support for programming languages and operating systems (ASPLOS-II), Randy Katz (Ed.). IEEE Computer Society Press, Los Alamitos, CA, USA, pp. 65-69. DOI=10.1145/36206.36185 http://dx.doi.org/10.1145/36206.36185 (1987).
DEC Firefly, Wikipedia, http://en.wikipedia.org/wiki/DEC_Firefly, last printed Feb. 10, 2011, pp. 1-3.
Chow, J-H, et al., "False Sharing Elimination by Selection of Runtime Scheduling Parameters", In Proceedings of the International Conference on Parallel Processing, Sep. 1997, pp. 396-403.
Jeremiassen, et al., "Reducing false sharing on shared memory multiprocessors through compile time data transformations", In Proceedings of the Fifth ACM SIGPLAN Symposium on Principles and Practice of Parallel Programming, Jul. 19-21, 1995.
Kandemir, et al., "Reducing False Sharing and Improving Spatial Locality in a Unified Compilation Framework", IEEE Trans. Parallel Distrib. Syst. 14, 4 (Apr. 2003) pp. 337-354.
Office Action dated Jan. 7, 2013 received in a related U.S. Patent Application, namely U.S. Appl. No. 13/604,349.

* cited by examiner

*Primary Examiner* — Reginald Bragdon
*Assistant Examiner* — Aracelis Ruiz
(74) *Attorney, Agent, or Firm* — Scully, Scott, Murphy & Presser, P.C.; Daniels P. Morris, Esq.

(57) ABSTRACT

An apparatus, method and computer program product for improving performance of a parallel computing system. A first hardware local cache controller associated with a first local cache memory device of a first processor detects an occurrence of a false sharing of a first cache line by a second processor running the program code and allows the false sharing of the first cache line by the second processor. The false sharing of the first cache line occurs upon updating a first portion of the first cache line in the first local cache memory device by the first hardware local cache controller and subsequent updating a second portion of the first cache line in a second local cache memory device by a second hardware local cache controller.

11 Claims, 10 Drawing Sheets

| | V | I | F |
|---|---|---|---|
| V | YES | YES | YES |
| I | YES | YES | YES |
| F | YES | YES | YES |

410 — (top V), 405 — (top I), 415 — (top F)
410 — (row V), 405 — (row I), 415 — (row F)

WRITE-THROUGH CACHE OPTIMIZED FOR DEPENDENCE-FREE PARALLEL REGIONS

BACKGROUND

The present application generally relates to a parallel computing system. More particularly, the present application relates to a cache coherence protocol operated in the parallel computing system.

A traditional parallel computing system does not allow updates to the same cache line address by more than one thread(s) or processor(s) at a time. In other words, if a processor wants to update a cache line in an associated local cache memory device, the traditional parallel computing system must first invalidate the corresponding cache lines in other local cache memory devices. Cache coherent mechanisms are therefore implemented in computing systems to update local cache memory devices, e.g., to invalidate cache lines in local cache memory devices. Therefore, two or more distinct threads and/or processors in the traditional parallel computing system cannot simultaneously update the same cache line address running a cache coherence operation across local cache memory devices. To prevent the simultaneous updates of the same cache line address when accessed by two or more distinct thread(s) or processor(s), the traditional parallel computing system requires more frequent communications (e.g., broadcasting an invalidation notice to other local cache memory devices) between local cache memory devices, and frequently invalidates cache lines in local cache memory devices.

SUMMARY OF THE INVENTION

The present disclosure describes an apparatus, method and computer program product for improving performance of a parallel computing system that includes a plurality of processors and at least one shared cache memory device. Each processor may include at least one local cache memory device (e.g., "level-1 (L1)" cache memory device).

In one embodiment, there is provided an apparatus for improving performance of a parallel computing system. The apparatus comprises a plurality of processors. Each processor has a local cache memory device. Each processor runs program code of a software program region having no data dependency. A local cache memory device of each processor is associated with a hardware local cache controller that updates a cache line in the local cache memory device. A first hardware local cache controller associated with a first local cache memory device of a first processor detects an occurrence of a false sharing of a first cache line by a second processor running the program code and allows the false sharing of the first cache line by the second processor. The false sharing of the first cache line occurring upon updating a first portion of the first cache line in the first local cache memory device by the first hardware local cache controller and subsequent updating a second portion of the first cache line in a second local cache memory device by a second hardware local cache controller.

In a further embodiment, other hardware local cache controllers set false sharing bits corresponding to the first cache line in other local cache memory devices when the first hardware local cache controller updates the first portion of the first cache line in the first local cache memory device.

In a further embodiment, the first hardware local cache controller sets a false sharing bit corresponding to the first cache line in the first local cache memory device when the second hardware local cache memory device updates the second portion of the first cache line in the first cache line in the second local cache memory device, and the second hardware local cache controller sets a false sharing bit corresponding to the first cache line in the second local cache memory device when the first hardware local cache memory device updates the first portion of the first cache line in the first local cache memory device.

In a further embodiment, the first hardware local cache controller and the second hardware local cache controller, in response to the plurality of processors reaching an end of the software program region with no data dependency, invalidating cache lines, in the first local cache memory device and the second local cache memory device, whose false sharing bits are set In a further embodiment, any writing to a local cache memory is written through to a cache memory device shared by the plurality of processors.

In a further embodiment, the first hardware local cache controller is prevented from setting a false sharing bit of the first local cache memory device, and the other hardware local cache controllers are prevented from invalidating cache lines in local cache memory devices whose false sharing bits are not set.

In a further embodiment, when the first hardware cache controller updates the first portion of the first cache line in the first local cache memory device, the first hardware local cache controller sets a false sharing bit of the first local cache memory device, other hardware local cache controllers set false sharing bits of the corresponding cache lines in other local cache memory devices, and there is no further communication among hardware local cache memory controllers upon a subsequent occurrence of a false sharing on the corresponding cache lines.

In a further embodiment, in response to the processors reaching at an end of the software program region with no data dependency, the first hardware local cache controller completes the updating the cache line in the first local cache memory before one or more of other hardware local cache controllers set false sharing bits of the corresponding cache lines in other local cache memories.

In a further embodiment, in response to the processors reaching at the end of the software program region with no data dependency, the first hardware local cache controller selectively invalidates some of cache lines whose false sharing bits are set.

In a further embodiment, in response to the processors reaching at the end of the software program region with no data dependency, the first hardware local cache controller selectively updates some of cache lines whose false sharing bits are set by fetching valid data from the shared cache memory.

In a further embodiment, to detect the occurrence of the false sharing, the first hardware local cache controller and the second hardware local cache controller use a central directory or snooping technique.

BRIEF DESCRIPTION OF THE DRAWINGS

The accompanying drawings are included to provide a further understanding of the present invention, and are incorporated in and constitute a part of this specification.

DETAILED DESCRIPTION

Figure 7:
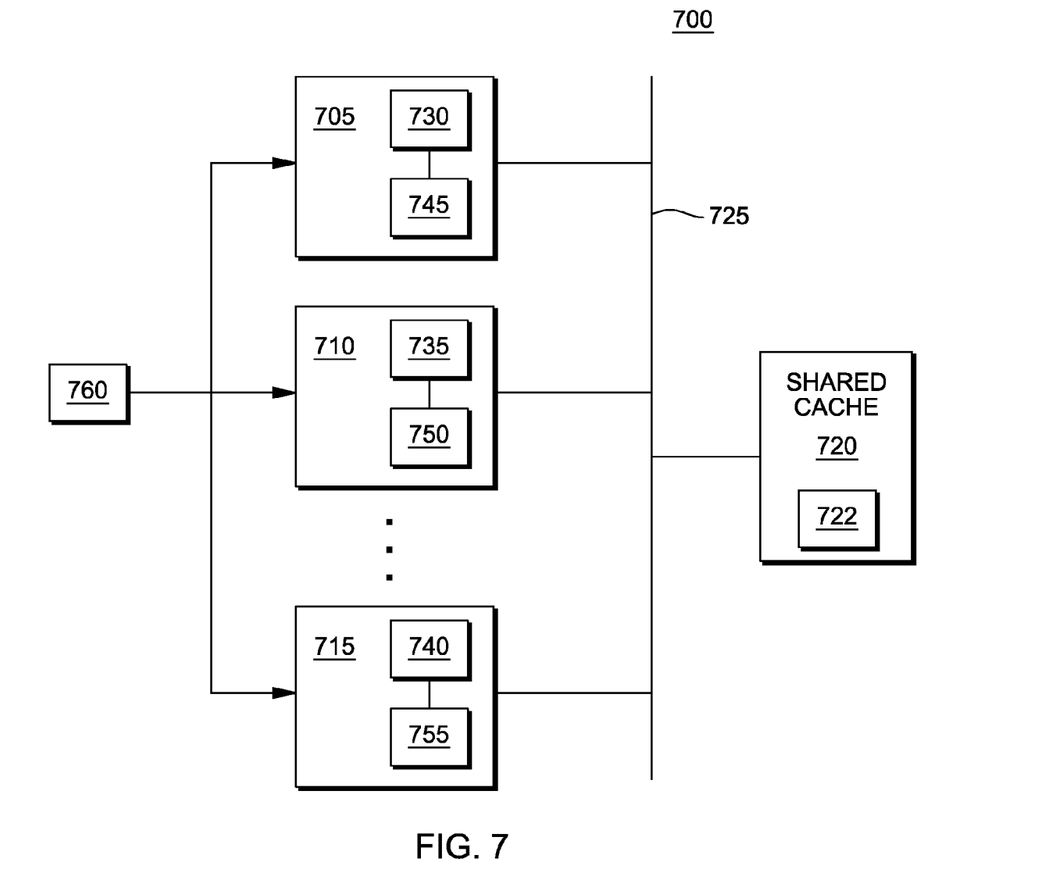
FIG. 7 illustrates an exemplary parallel computing system for implementing the flow chart depicted in FIGS. 1 and 9-10 according to one embodiment.

In one embodiment, FIG. 7 illustrates a parallel computing system 700 (e.g., IBM® Blue Gene®/Q, etc.) that includes a plurality of processors 705-715 (e.g., IBM® powerPC® processors, etc.) and a shared cache memory device 720. Each processor may include a local cache memory device, e.g., a local cache memory device 730 in a processor 705, a local cache memory device 735 in a processor 710, and a local cache memory device 740 in a processor 715, etc. Each processor may also include a hardware local cache controller per local cache memory device. A hardware local cache controller controls local cache memory read and write operations. For example, a hardware local cache controller 745 associated with the processor 705 controls the local cache memory device 730, e.g., by setting a flag bit to invalidate a cache line in the local cache memory device 730. Similarly, a hardware local cache controller 750 controls the local cache memory device 735. A hardware local cache controller 755 controls the local cache memory device 740. Any update in any local cache memory is written through to the shared cache memory device 720, e.g., via a bus or a network 725. The shared cache memory device 720 also includes a hardware cache controller 722 that controls the shared cache memory device 720. A compiler 760 is provided to transform a high-level programming code to a machine code.

Figure 1:
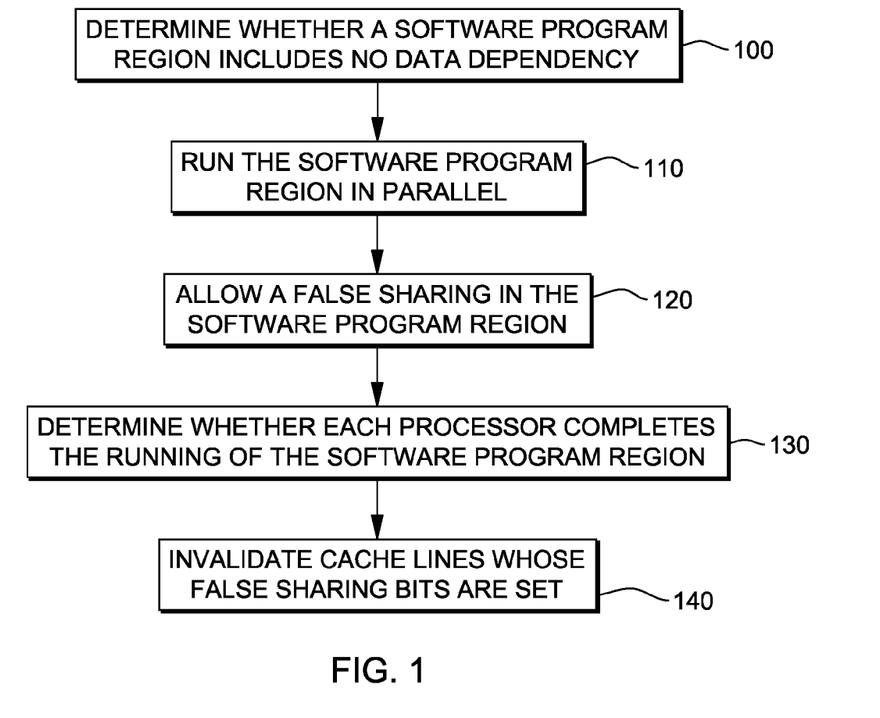
FIG. 1 illustrates a flow chart illustrating method steps for improving performance of a parallel computing system according to one embodiment.
Figure 2:
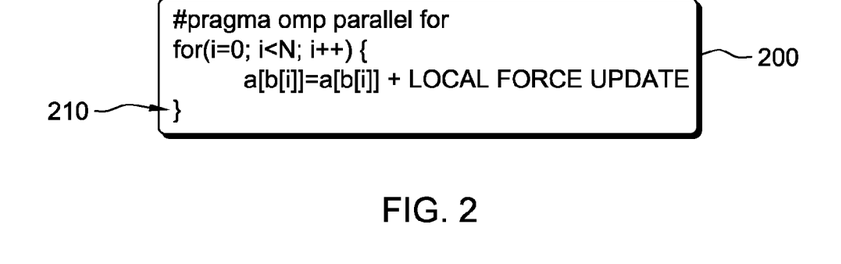
FIG. 2 illustrates an exemplary software program region that includes no data dependency in one embodiment.

The parallel computing system 700 may run method steps in FIG. 1 to improve its performance. At step 100 in FIG. 1, upon entering a software program region (e.g., a software "for" loop 200 shown in FIG. 2), the compiler 760 determines whether the software program region includes a data dependency. The compiler knows which part(s) of the software program can be run in parallel, either because a user explicitly requested a particular subset of the software program to run in parallel, or because the compiler analyzed corresponding program code and decided that a specific subset(s) of the software program can be run in parallel. Once, the compiler knows that a part(s) of the program code can be run in parallel, the compiler inserts function calls to a runtime library that will handle creation of parallel tasks (i.e., software program region run in parallel by a plurality of processors). The compiler may insert special instructions where the parallel tasks start and end. In one embodiment, the compiler calls the runtime library that will create the software program region to run in parallel, so the runtime library calls the special instructions just before running of the software program region in parallel and calls the special instructions just after running of the software program region in parallel stops. In another embodiment, the compiler instruments the program code to be run in parallel, so that the first instruction of the software program region run in parallel is one special instruction, and the last instruction of the software program region run in parallel is another special instruction. For example, to determine whether the software loop 200 includes a data dependency, the compiler may evaluate whether an output of a preceding software program line is used as an input of a subsequent software program line in the software loop 200. In the software "for" loop 200 in FIG. 2, if two distinct elements in the array "b" include no same data value, there is no data dependency because an output of preceding loop iteration is not used as an input of subsequent loop iteration. The compiler 760 further determines start and end boundaries of the software program region with no data dependency, e.g., based on a loop exit condition of the software "for" loop 200 in FIG. 2. At step 110 in FIG. 1, after the compiling, all or some of the processors run the software program region with no data dependency in parallel in response to that the compiler determines that the software program region has no data dependency. For example, at least two different processors run the software "for" loop 200 shown in FIG. 2. If there is a data dependency in the software program region, a single processor may run the software program region with the data dependency. While running the software program region with no data dependency in parallel, each processor may make a change in its local cache memory device. However, according to this embodiment, changes in a local cache memory device need not be seen by other local cache memory devices until each processor reaches a barrier (i.e., a point where all participating processors need to arrive, and only then can each processor proceeds with its subsequent running).

As shown at step 120 in FIG. 1, when all or some of the processors starts to run the software program region with no data dependency in parallel, a hardware local cache controller associated with a local cache memory device of each processor allows a false sharing in the software region. A false sharing refers to updating different portions of the same cache line address in at least two different local cache memories.

Figure 3A:
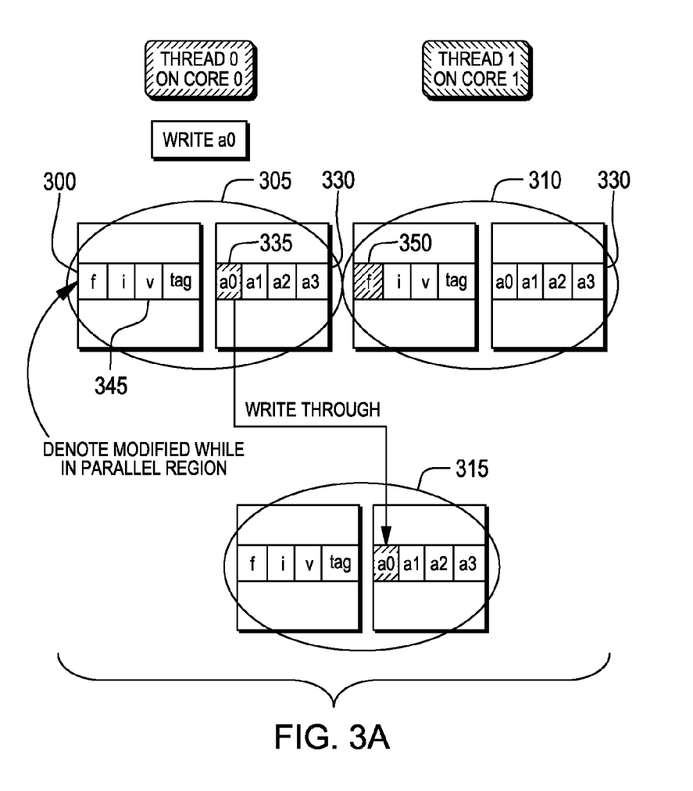
FIGS. 3A-3C illustrate allowing a false sharing instance in one embodiment.
Figure 3B:
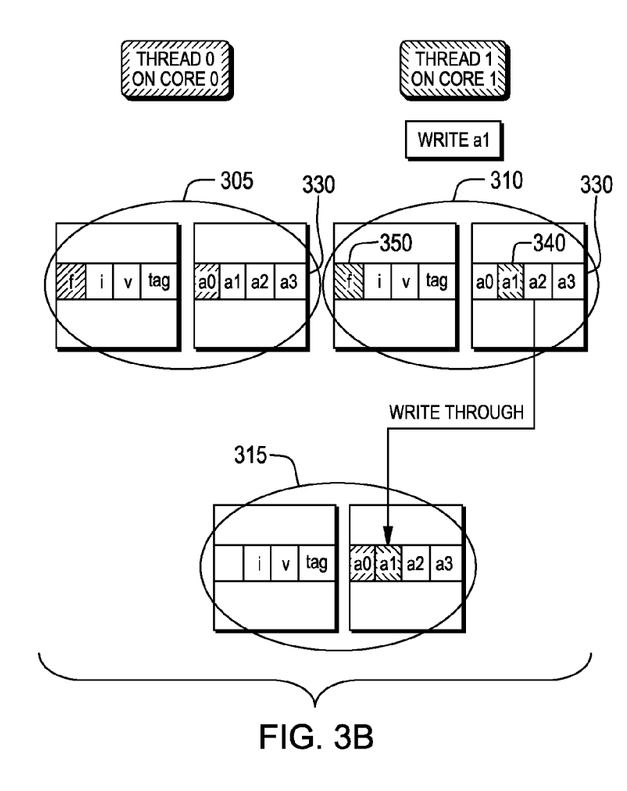
Figure 3C:
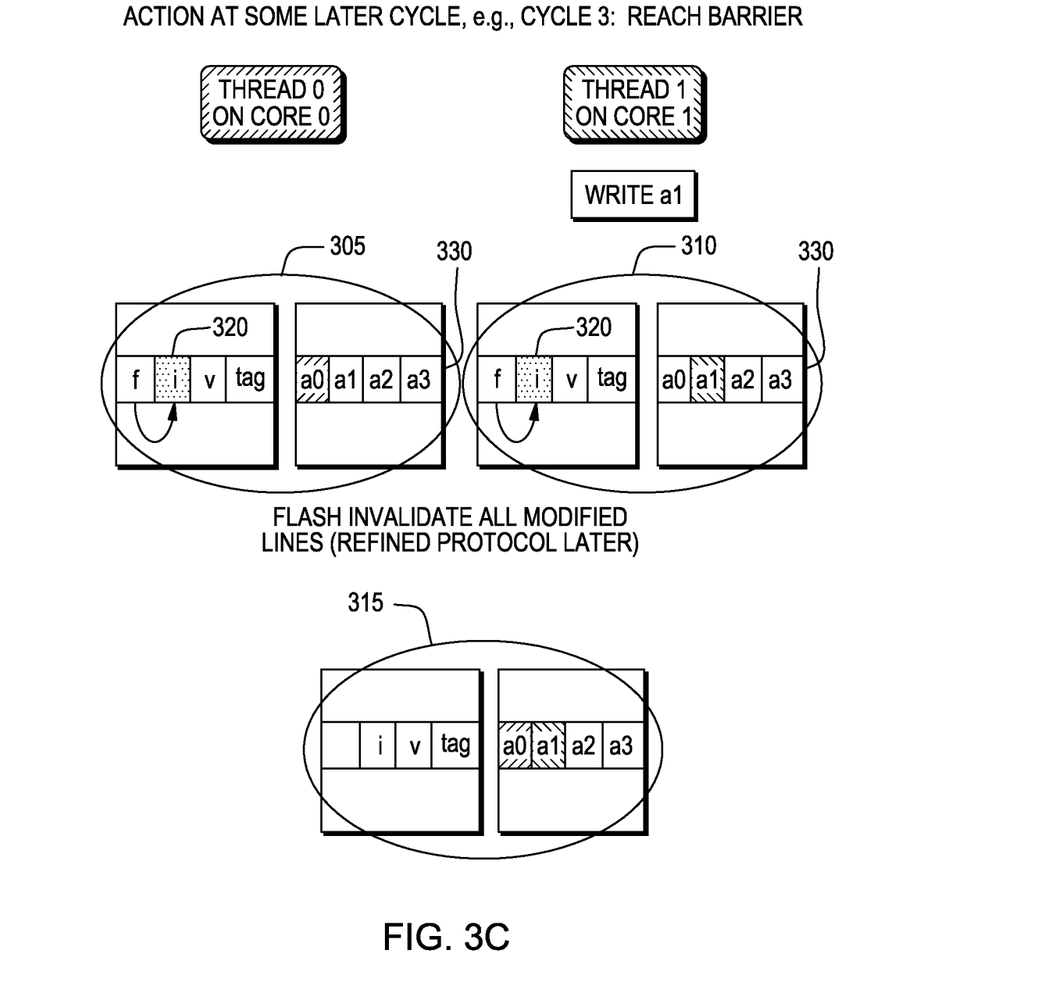

An embodiment of allowing the false sharing is described in detail in conjunction with FIGS. 3A-3C. Upon an occurrence of a write operation to a cache line in a local cache memory device, a corresponding hardware local cache controller sets a false sharing bit ("false sharing bit" 300 in FIG. 3A) in the corresponding cache line 330 in that local cache memory device. In one embodiment, all hardware local cache controllers snoop (i.e., monitor) all local cache memory devices. So, upon an occurrence of a write operation to a single local cache memory device, other hardware local cache controllers detect the occurrence of the write operation, e.g., through the snooping, and set corresponding false sharing bits in corresponding cache lines in other local cache memory devices. Thus, in one embodiment, an update in a local cache memory device does not invalidate corresponding cache lines in other local cache memory devices. Since the parallel computing system 700 allows the false sharing, another processor can subsequently write to a different portion of the same cache line. This subsequent writing to the same cache line also does not invalidate the same cache line(s) in other local cache memory devices. By allowing the false sharing, the parallel computing system 700 reduces communication overhead between local cache memory devices to invalidate a cache line whenever a write operation to a local cache memory device occurs.

Returning to FIG. 1, at step 130, the compiler determines a location in program code where each processor completes the running of the software program region with no data dependency. For example, in FIG. 2, the compiler may determine that each processor completes the running of the software program region, e.g., by evaluating a loop exit condition associated with each processor. More specifically, the compiler determine that the location (e.g., a location 210 in FIG. 2) in the program code where each processor completes the parallel region correspond to the code just after each processor completes computation of a subsection of original loop iterations "0" to "N−1" that was assigned to it. At step 140 in FIG. 1, upon the compiler 760 detecting that a processor completes the running of the software program region with no data dependency, the compiler inserts a special instruction (or sequence of special instructions) that will indicate to a corresponding hardware local cache controller associated with that processor to invalidates cache line(s), in its associated local cache memory device, whose false sharing bits are set. Thus, in one embodiment, the parallel computing system 700 invalidates cache line(s) in local cache memory devices whose false sharing bits are set, upon reaching a barrier or upon exiting software program region with no data dependency.

FIGS. 3A-3C illustrate an exemplary false sharing in one embodiment. Initially, a local cache memory device 305 and another local cache memory device 310 have a same cache line 330. As shown in FIG. 3A, thread 0 on a processor 0 modifies a first portion 335 in a cache line 330 in the local cache memory device 305. The modification in the local cache memory device 305 is also written through to the shared cache memory device 315. Upon detecting this modification in the local cache memory device 305, e.g., through snooping, a hardware local cache controller of a local cache memory device 310 sets a false sharing bit 350 of the cache line 330 in the local cache memory device 310. A false sharing bit 350 denotes that its corresponding cache line in its corresponding local cache memory device has been modified while processors or threads running software program region with no data dependency. Coherence traffic (e.g., cache coherence operations, etc.) between local cache memory devices are prevented while processors or threads running the software program region with no data dependency: any local cache memory device may not have up-to-date data, but each local cache memory device may have its own value. Some time later, shown in FIG. 3B, a thread 1 on a processor core 1 modifies a second portion 340 in the cache line 330 in a local cache memory device 310. This modification includes setting a false sharing bit 300 of the cache line 330 in the local cache memory device 305. The modification in the local cache memory device 310 is also written through to the shared cache memory device 315. These local modifications performed in local cache memory devices do not invoke a cache coherence operation (e.g., invaliding the cache line 330).

While processors run a software program region with no data dependency, no local cache memory device has an up-to-date data. Each local cache memory device has its own data value. Although the parallel computing system 700 including hardware local cache controllers allows a false sharing (i.e., allowing writes in different portions in a same cache line), the parallel computing system 700 prevents any subsequent writing on a same portion in a same cache line in the software program region with no data dependency, e.g., by letting the compiler 760 detect such subsequent writing on the same portion. In the one embodiment, there is one false sharing bit per cache line in a local cache memory device. A false sharing bit is initially set to zero, but is set to one whenever a false sharing and/or local writing occur. In another embodiment, there can be more than one false sharing bit per cache line. For example, the cache line may be divided in several sub-sectors and each sub-sector can be associated with its own false sharing bit.

As shown in FIG. 3C, in one embodiment, upon reaching a barrier, each hardware local cache controller invalidates cache lines, in its associated local cache memory device, whose false sharing bits are set. For example, a hardware local cache controller associated with the local cache memory device 305 invalidates the cache line 330 in the local cache memory device 305, e.g., by setting a corresponding invalid bit 320. Similarly, a hardware local cache controller associated with the local cache memory device 310 invalidates the cache line 330 in the local cache memory device 310, e.g., by setting a corresponding invalid bit 320. In one embodiment, a hardware local cache controller may validate an invalid cache line in its associated local cache memory device, e.g., by fetching data from the shared cache memory device since the shared cache memory device always has valid data due to a cache "write through" scheme.

Figure 4:
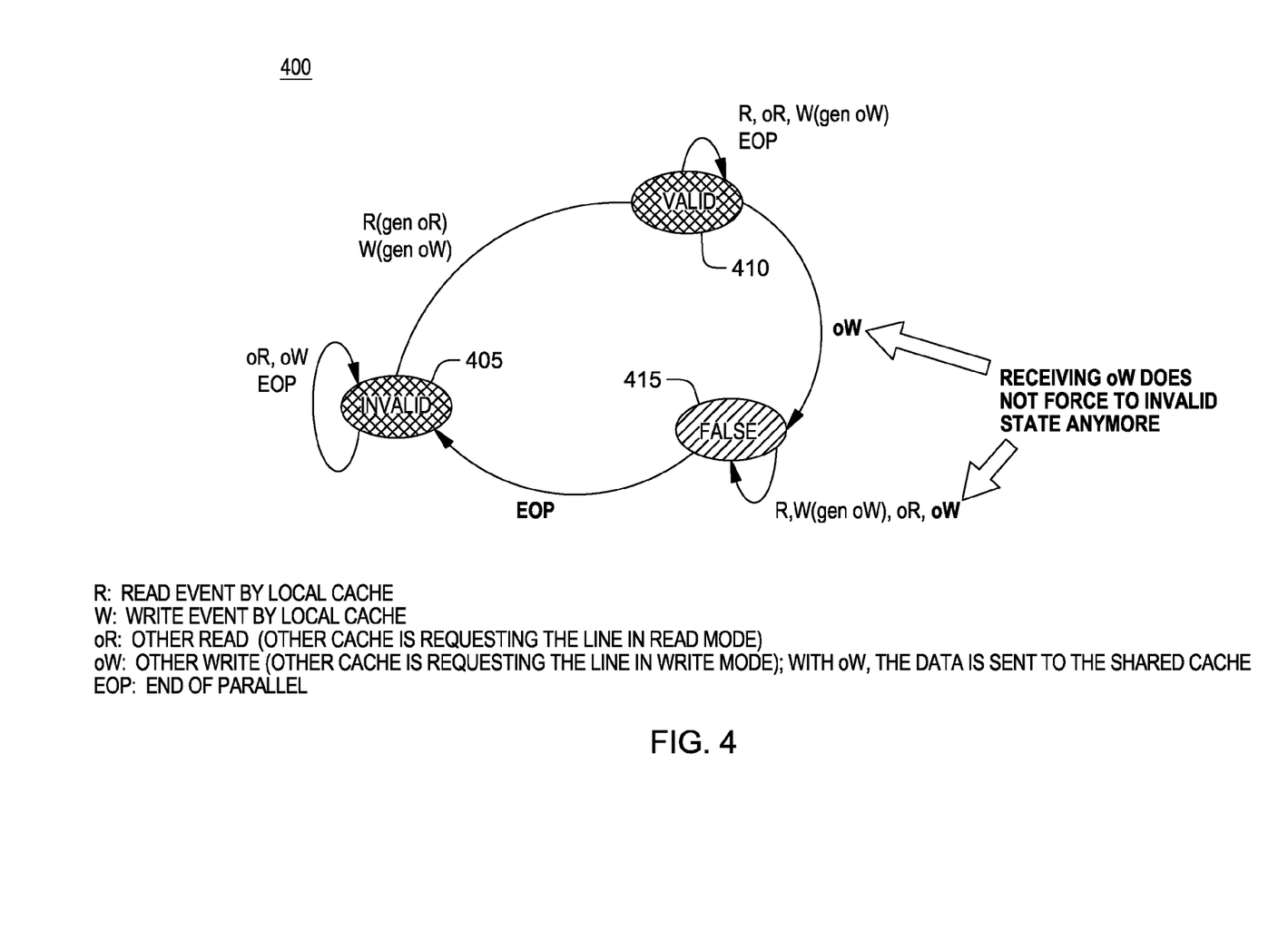
FIG. 4 illustrates a state diagram that allows a false sharing in one embodiment.

FIG. 4 illustrates a state transition diagram 400 that indicates states of a cache line in a local cache memory device in one embodiment. "R" refers to a local read event in the local cache memory device. "W" refers to a local write event in the local cache memory device. "oR" refers to other read events (other threads requesting to read that cache line in other local cache memory devices). "oW" refers to other write events (other threads requesting to write that cache line in other local cache memory devices). "EOP" refers to an end of a parallel region (i.e., an end of a software program region that includes no data dependency). Initially, the cache line in the local cache memory may be in a "valid" state 410 (i.e., a state representing that data in the cache line are all valid). Whether the cache line is valid or not may be represented by a valid bit (e.g., a valid bit 345 in FIG. 3A), e.g., set by a corresponding hardware local cache controller upon fetching a valid data from the shared cache memory device. While the cache line in the local cache memory device is in the valid state, the cache line in the local cache memory device does not make any state transition though there exists an occurrence of a local read event, remote read event ("oR"), local write event or EOP. A local writing event always generates a remote write event ("oW") in same cache lines in other local cache memory devices. If a hardware local cache controller detects "oW" event occurrence, e.g., through snooping, a corresponding valid cache line in its corresponding local cache memory makes a transition to a false sharing state 415 (i.e., a state in which a false sharing bit is set). Unlike the traditional parallel computing system, the remote write event ("oW") does not cause corresponding cache lines in other local cache memory devices to become invalid. An update in a cache line in a local cache memory device causes corresponding cache lines in other local cache memory devices to makes a transition to the false sharing state 415, e.g., by setting the false sharing bit (see FIG. 3A). While a cache line in a local cache memory device is in the false sharing state 415, that cache line in that local cache memory device is still in the false sharing state 415 upon an occurrence of either a local read event, a local write event that also generates "oW" event to other local cache memory devices, a remote read event ("oR") or a remote write event ("oW"). While a cache line in a local cache memory device is in the false sharing state 415, that cache line in that local cache memory device makes a transition to an invalid state 405 (i.e., a state that represents data in that cache line is invalid) upon an occurrence of "EOP" event (e.g., upon reaching a barrier). While a cache line in a local cache memory device is in the invalid state 405, that cache line in that local cache memory device is still in the invalid state 405 upon an occurrence of a remote read event, a remote write event or "EOP" event. While a cache line in a local cache memory device is in the invalid state 405, that cache line in that local cache memory device makes a transition to the valid state 410 upon an occurrence of a local read event that also causes a remote read event to other local cache memory devices or upon an occurrence of a local write event that also causes a remote write event to other local cache memory devices, e.g., by fetching valid data from the shared cache memory device.

Figure 5A:
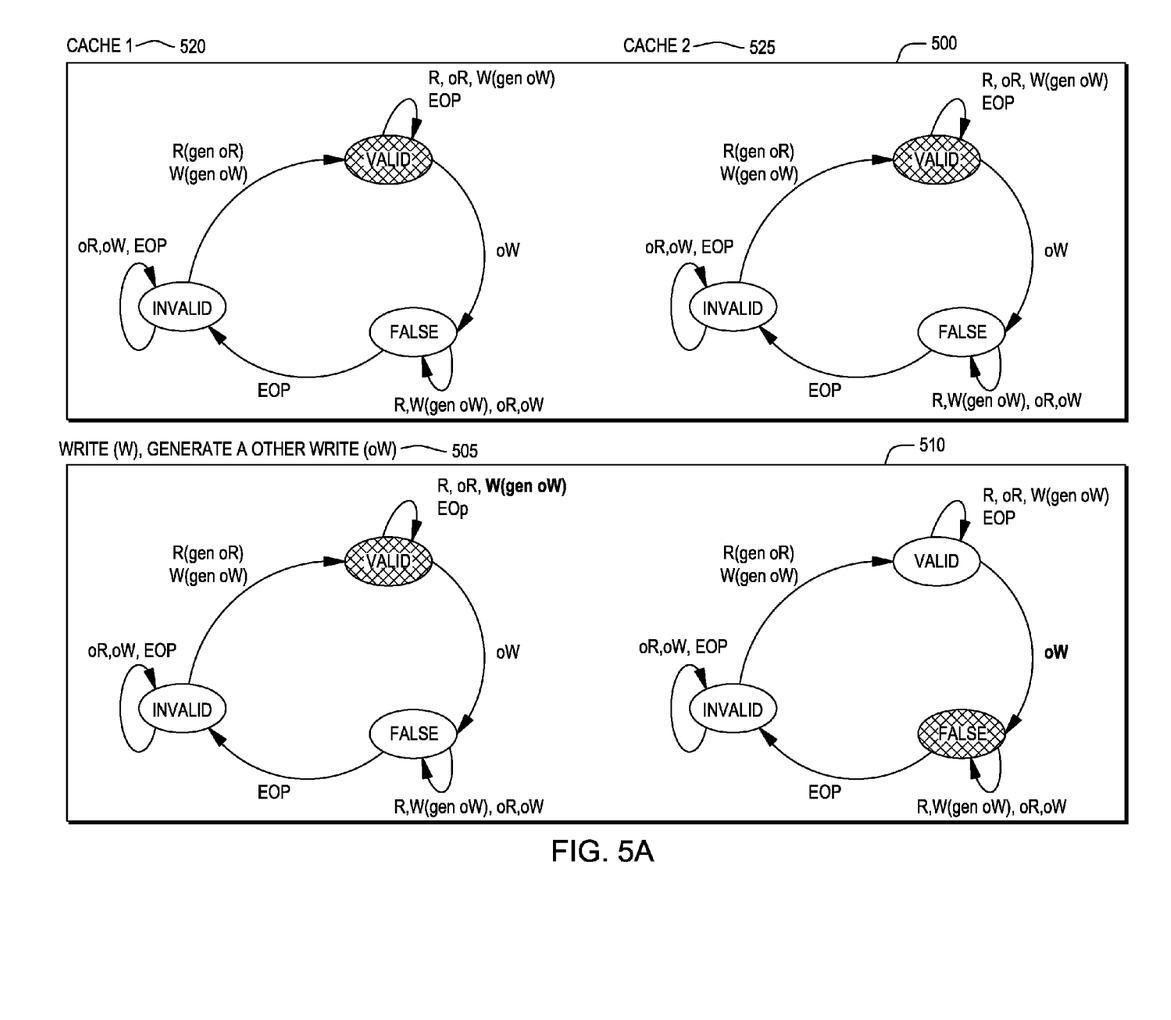
FIGS. 5A-5B illustrate exemplary state transitions in one embodiment.
Figure 5B:
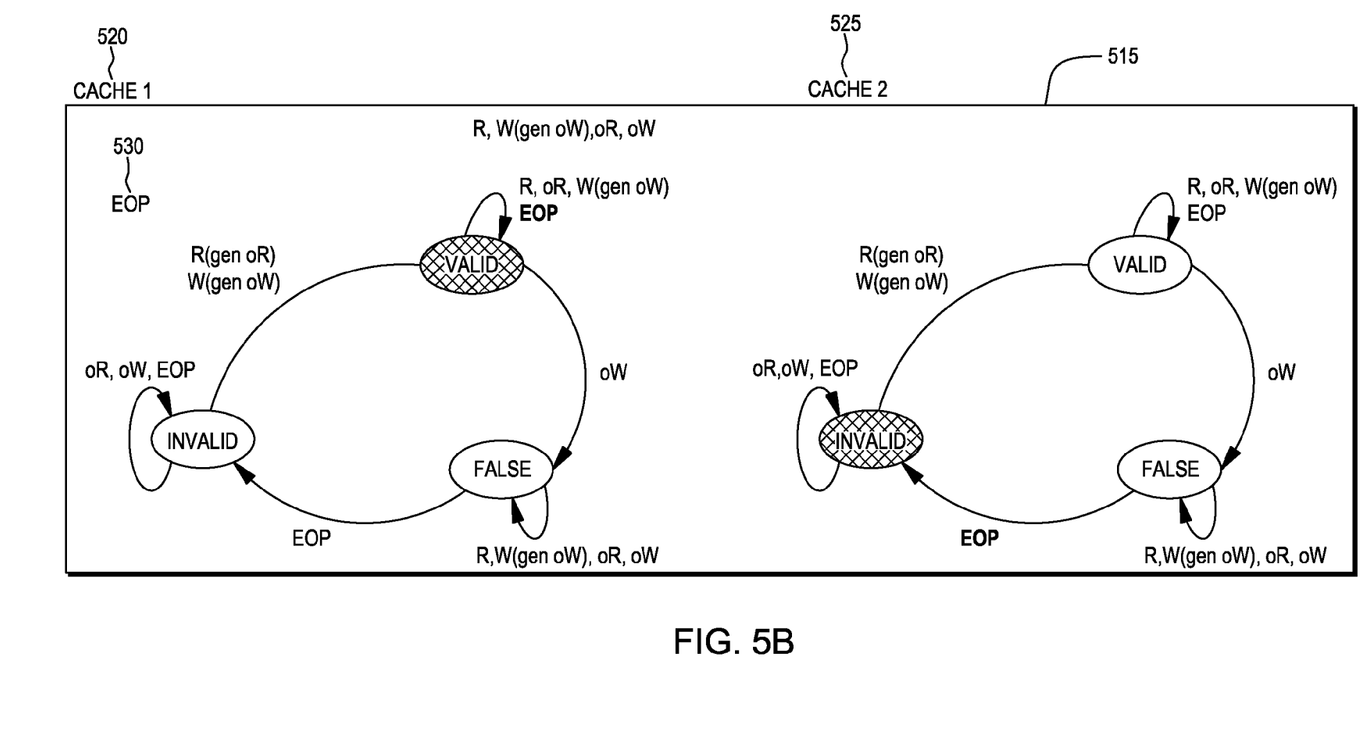

FIGS. 5A-B illustrates exemplary state transitions in two exemplary local cache memory devices that allow false sharing in one exemplary embodiment. In this exemplary embodiment, as shown in a stage 500, for a given cache line, a first local cache memory device 520 is initially in the valid state, and a second local cache memory device 525 is initially in the valid state. Then, a first processor associated with the first local cache memory device 520 writes 505 to a cache line in the first local memory device 520. This writing 505 also generates a remote write event to other local cache memory devices. Thus, upon the occurrence of the writing 505, as shown in a stage 510, the first local cache memory device 520 is still in the valid state, but the second local cache memory device 525 makes a transition to the false sharing state. Note that the second local cache memory device 525 does not go to the invalid state upon the occurrence of the writing 505. As shown in a stage 515 in FIG. 5B, upon an occurrence of "EOP" event 530, the first local cache memory device 520 is still in the valid state, but the second local cache memory device 525 makes a transition to the invalid state.

Figure 6:
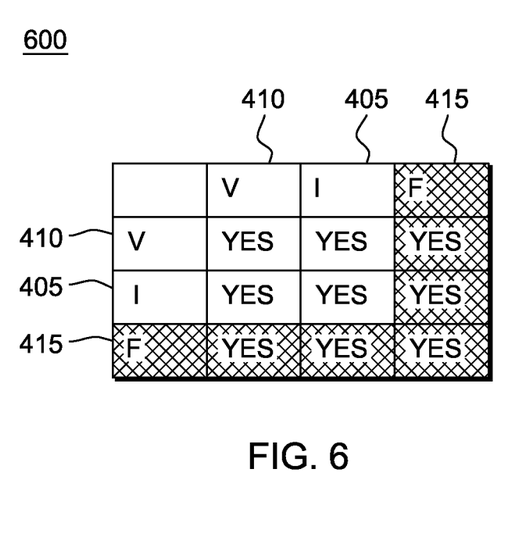
FIG. 6 is a table that summarizes state transitions in one embodiment.

FIG. 6 illustrates a table 600 that summarizes state transitions in a local cache memory device. While a processor associated with that local cache memory device runs a non-parallel software program region in which processors do not run program in parallel, a cache line in the local cache memory device can go from the valid state 410 to the valid state 410, e.g., upon an occurrence of a local read event. A cache line in the local cache memory device can go from the valid state 410 to the invalid state 405, e.g., upon an occurrence of a remote write event in the non-parallel software program region. A cache line in the local cache memory device can go from the invalid state 405 to the valid state, e.g., upon an occurrence of a local read event. A cache line in the local cache memory device can go from the invalid state 405 to the invalid state 405, e.g., upon an occurrence of a remote write event.

While a processor associated with a local cache memory device runs a software program region that has no data dependency and that is run in parallel with other processors, a cache line in that local cache memory device can make a transition from the valid state 410 to the valid state 410, e.g., upon an occurrence of a local read event. A cache line in the local cache memory device can make a transition from the valid state 410 to the invalid state 405, e.g., upon an occurrence of a remote write event in the non-parallel software program region. A cache line in the local cache memory device can make a transition from the valid state 410 to the false sharing state 415, e.g., upon an occurrence of a remote write event in the software program region run in parallel. A cache line in the local cache memory device can make a transition from the invalid state 405 to the valid state, e.g., upon an occurrence of a local read event. A cache line in the local cache memory device can make a transition from the invalid state 405 to the invalid state 405, e.g., upon an occurrence of a remote write event. A cache line in the local cache memory device can make a transition from the invalid state 405 to the false sharing state 415, e.g., upon an occurrence of a local read event and a subsequent occurrence of a remote write event. A cache line in the local cache memory device can make a transition from the false sharing state 415 to the valid state 410, e.g., by fetching valid data from the shared cache memory device. A cache line in the local cache memory device can make a transition from the false sharing state 415 to the false sharing state 415, e.g., upon an occurrence of a local read event in the software program region run in parallel. A cache line in the local cache memory device can make a transition from the false sharing state 415 to the invalid state 405, e.g., upon an occurrence of "EOP" event in the software program region run in parallel.

In one embodiment, within a software program region that has no data dependency and that can be run by a plurality of processors in parallel, a local read miss causes a corresponding processor to fetch valid data from the shared cache memory device and does not demote (e.g., invalidate or degrade to false sharing state) corresponding cache lines in other local cache memory devices. In that software program region, a local write miss causes a corresponding processor to bring valid data from the shared cache memory device, and does not invalidate corresponding cache lines in other local cache memory devices. In the software program region, a local read event causes the processor to read data from the corresponding local cache memory device. In the software program region, a local write event causes the processor to write data to the corresponding local cache memory device and to write the same data to the shared cache memory device. In that software program region, a hardware local cache controller evicts a cache line in its local cache memory device, e.g., based on known LRU (Least Recently Used) algorithm or other cache line eviction algorithms.

Right before exiting the software program region that has no data dependency and that are run by a plurality of processors in parallel, each hardware local cache controller invalidates cache lines, in its cache memory device, whose false sharing bits are set. Alternatively, a hardware local cache controller may fetch valid data, from the shared cache memory device, that correspond to the cache line in the local cache memory device whose false sharing bit is set.

Figure 8:
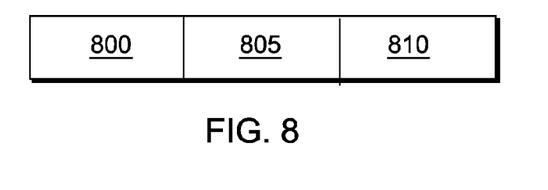
FIG. 8 illustrates flag bits in one embodiment.

In one embodiment, the parallel computing system 700 utilizes three different flag bits (not shown) that represent three different events. A first flag bit may represent a start of the software program region that has no data dependency and that can be run by a plurality of processors in parallel. A compiler may set this first flag bit upon determining that a software program region has no data dependency and can be run in parallel. A second flag bit may represent an end of the software program region that has no data dependency and that is run by a plurality of processors in parallel. A compiler may set this second flag bit upon determining that a processor or a thread exits that software program region. A third flag bit (i.e., false sharing bit) may represent a transition to the false sharing state. There may be a one-bit false sharing bit per one cache line in a local cache memory device. Upon an occurrence of a false sharing, a hardware local cache controller may set this false sharing bit of a corresponding cache line of its local cache memory device.

In one embodiment, a hardware local cache controller may not use a dedicated bit for representing a state of its corresponding local cache memory device, and may instead represent several states using two or more bits. For example, FIG. 4 indicates three states, which may be represented by having one bit to indicate whether a status of a cache line is invalid, one bit to indicate whether the status of the cache line is valid, and one bit to indicate whether the status of the cache line is false sharing. Alternatively, a hardware local cache controller may implement these 3 states, e.g., by using two bits, where "00" indicate that the status of the cache line is invalid, the "01" indicates that the status of the cache line is valid, and "10" to indicate that the status of the cache line is false sharing. So, in one embodiment, there may be distinct bits for the valid/invalid/false sharing state. In another embodiment, these three states may be implemented by combination of bits shared with other data being tracked in a local cache memory device.

In one embodiment, within the software program region that has no data dependency and that is run by a plurality of processors in parallel, upon an occurrence of a local write event, the corresponding cache line in the corresponding local cache memory device remains in the valid state. If no false sharing occurs in the cache line, there is no need to invalidate the corresponding cache line in the corresponding local cache memory device at the end of the software program region. However, if a false sharing occurs in the corresponding cache line, e.g., two different processors write to different portions of the same cache line in their local cache memory devices, the corresponding cache line in the corresponding local cache memory device makes a transition to the false sharing state.

In another embodiment, within the software program region that has no data dependency and that is run by a plurality of processors in parallel, upon an occurrence of a local write event that constitutes a false sharing event to other local cache memory devices, the corresponding cache line in the corresponding local cache memory device makes a transition to the false sharing state. In this embodiment, upon a subsequent occurrence of a false sharing in the cache line, there is no need to communicate this subsequent occurrence of the false sharing between local cache memory devices except the first occurrence of the local write event. In this embodiment, at the end of the software program region, hardware local cache controllers invalidate cache lines, in their local cache memory devices, whose false sharing bits are set.

Figure 9:
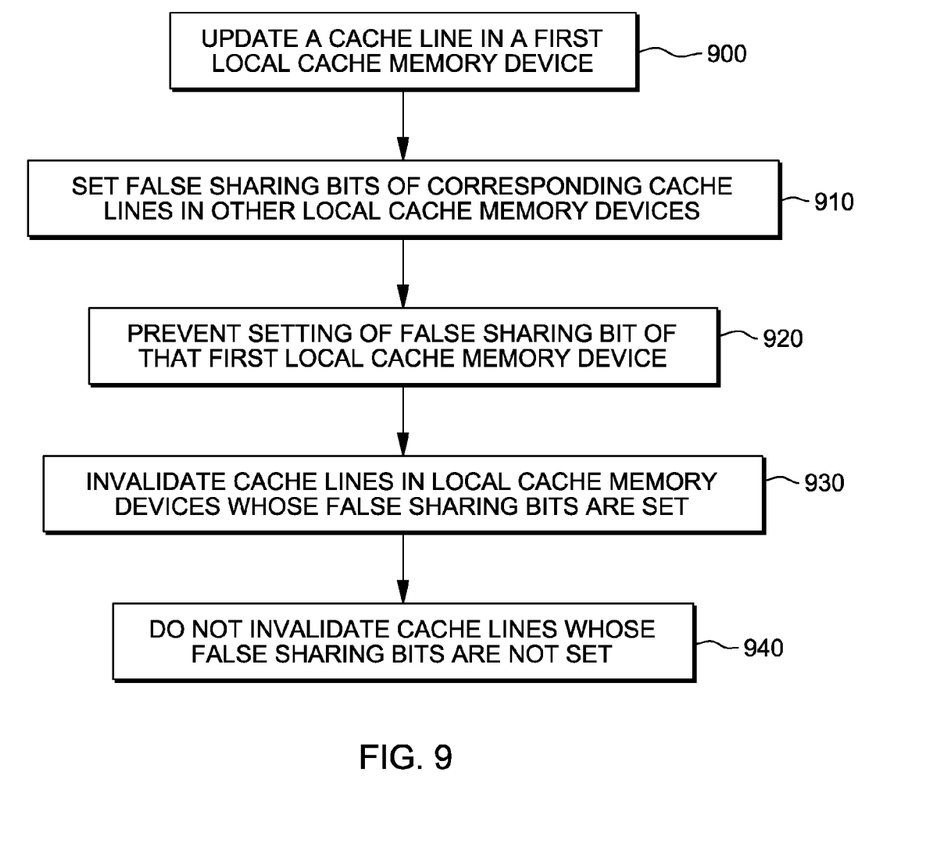
FIG. 9 is a flow chart illustrating method steps for improving performance of a parallel computing system according to one embodiment.

In one embodiment, FIG. 9 illustrates a flow chart that describes method steps for setting false sharing bits and invalidating cache lines whose false sharing bits are set. At step 900, while the processors run the software program region with no data dependency in parallel, a first hardware local cache controller updates a cache line in a first local cache memory device. At step 910, while the processors run the software program region with no data dependency in parallel, other hardware local cache controllers set the false sharing bits of corresponding cache lines in other local cache memory devices. However, as shown at step 920, after updating the cache line, while the processors run the software program region with no data dependency in parallel, the first hardware local cache controller is prevented from setting the false sharing bit of the first local cache memory device. At step 930, hardware local cache controllers invalidate cache lines in local cache memory devices whose false sharing bits are set, upon the compiler detecting corresponding processors reaching at the end of the software program region with no data dependency. However, as shown at step 940, upon corresponding processors reaching at the end of the software program region with no data dependency, the hardware local cache controllers do not invalidate cache lines in local cache memory devices whose false sharing bits are not set.

Figure 10:
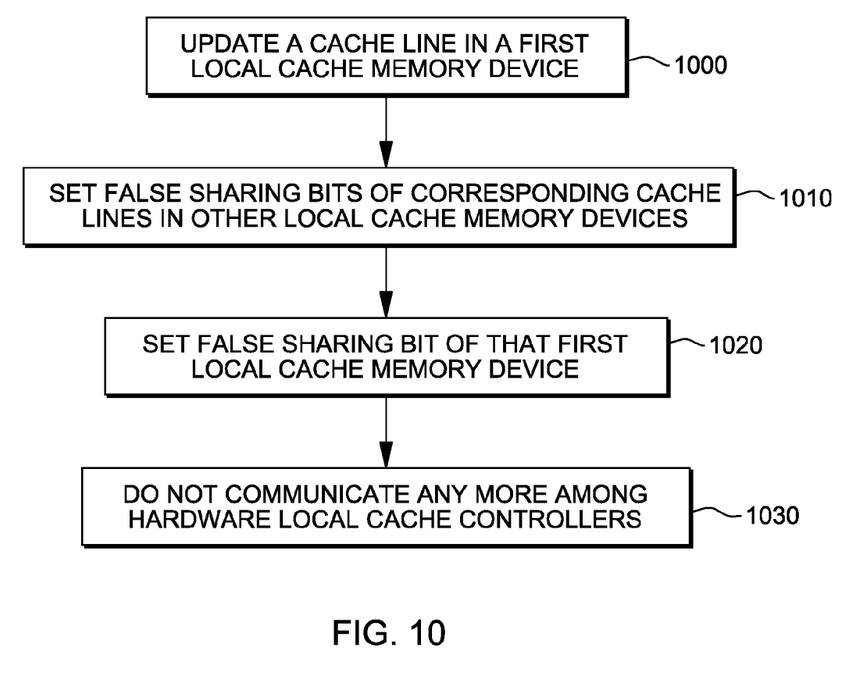
FIG. 10 is a flow chart illustrating method steps for improving performance of a parallel computing system according to another embodiment.

In another embodiment, FIG. 10 illustrates a flow chart that describes method steps for setting false sharing bits and invalidating cache lines whose false sharing bits are set. At step 1000, while the processors run the software program region with no data dependency in parallel, a first hardware local cache controller updates a cache line in a first local cache memory device. At step 1010, while the processors run the software program region with no data dependency in parallel, other hardware local cache controllers set false sharing bits of the corresponding cache lines in other local cache memory devices. At step 1020, after updating the cache line, while the processors run the software program region with no data dependency in parallel, the first hardware local cache controller sets the false sharing bit of the first local cache memory device. Then, as shown in step 1030, while the processors run the software program region with no data dependency in parallel, there is no further communication required among hardware local cache memory controllers upon a subsequent occurrence of a false sharing on the corresponding cache lines.

In one embodiment, upon the processors reaching at the end of the software program region with no data dependency, the hardware local cache controller selectively updates some (e.g., one or two or three, etc.) of the cache lines whose false sharing bits are set by fetching valid data from the shared cache memory. Upon the compiler detecting corresponding processors reaching at the end of the software program region with no data dependency, a hardware local cache controller selectively invalidates some (e.g., remainder) of cache lines whose false sharing bits are set. For example, by employing a known LRU (Least Recently Used) algorithm, the hardware local cache controller fetches valid data from the shared cache memory device to the local cache memory device for most recently used cache lines whose false sharing bits are set. The hardware local cache controller invalidates remaining cache lines whose false sharing bits are set. For those remaining cache lines, the hardware local cache controller needs not take any action, and may fetch valid data from the shared cache memory device upon an occurrence of a local read event or local write event on those remaining cache lines.

In a software program region that has a data dependency or that cannot be run in parallel, a local write to a valid cache line in a local cache memory device is written through to the shared cache memory device. In this software program region, while being written through to the shared cache memory devices, other hardware local cache memory devices invalidate the same cache lines in other local cache memory devices. Upon completing the invalidating and issuing the write-through operation, this local write is completed.

In a software program region that has no data dependency and that can be run in parallel, a local write to a valid cache line in a local cache memory device is written through to the shared cache memory device. In this software program region, while being written through to the shared cache memory devices, other hardware local cache memory devices make the same cache lines in other local cache memory devices move to the false sharing state. Upon completing the moving to the false sharing and issuing the write-through operation, this local write is completed.

Alternatively, the local writing can be completed before completing the moving to the false sharing or the being written through. In other words, if a first hardware local cache controller updates a cache line in a first local cache memory device, the first hardware local cache controller completes updating the cache line in the first local cache memory device before some (e.g., one or two, etc.) of other hardware local cache controllers set the false sharing bits of the corresponding cache lines in other local cache memories. The other hardware local cache controllers complete the setting of false sharing bits of the corresponding cache lines in other local cache memories before exiting the software program region with no data dependency. To implement this scheme, a specific series of steps is performed: where each thread (1) starts the software program region that has no data dependency, (2)

performs the computations where its local cache may update its cache line prior to some other local cache controllers setting the false sharing bits of the corresponding cache lines, (3) completes the computation of the parallel region, (4) ensures that all of the false sharing notification originating from its local cache controller have completed (i.e. all of the other cache controllers have been notified of all of the corresponding cache lines in which false sharing occurred due to the computation of this thread), (5) performs a synchronization barrier when all of the threads participating to this software program region have reached at the end of the software program region, and (6) performs an end-of-parallel region operation. Using this sequence of operations (1)-(6), it is ensured that there are no pending notifications of false sharing by any of the threads participating to the parallel region with no data dependencies when performing the end-of-parallel operation. To implement the operation (4), the local cache controller keeps track of any pending notification by the local cache controller to any other cache controller endeavoring to set the false sharing bit associated with the corresponding cache lines.

In one embodiment, the parallel computing system 700 operates a central directory or snooping technique to control all local cache memory devices and the shared cache memory device. Snooping technique refers to a system implemented in which every hardware local cache controller monitors every local cache memory device associated with all respective processors. So, upon an occurrence of a local write event, by employing the snooping technique, hardware local cache controllers can detect the occurrence of every local write event. The central directory may have one tag field corresponding to one cache ID whose data is valid: a local cache memory device described in the tag field has valid data, and corresponding cache lines in other local cache memory devices may be in the false sharing state. Upon a subsequent occurrence of a false sharing on the corresponding cache lines, the parallel computing system 700 may uses the tag field to move the valid cache line to the false sharing state, e.g., by setting a false sharing bit of that cache line. In other words, the parallel computing system 700 makes a change only on the valid cache line based on the tag field. Alternatively, each cache line in each local cache memory device has valid bit(s) that indicates whether its data is valid or not. Upon an occurrence of a false sharing event, the parallel computing system 700 makes changes only on cache lines whose valid bits are set. For example, the parallel computing system 700 turn off the valid bits of those cache lines and sets the false sharing bits of those cache lines.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving performance of a parallel computing system, the method comprising:
   providing a plurality of processors, each processor having a local cache memory device and each processor running program code of a software program region having no data dependency, a local cache memory device of each processor associated with a hardware local cache controller that updates a cache line in the local cache memory device; and
   detecting, by a first hardware local cache controller associated with a first local cache memory device of a first processor, an occurrence of a false sharing of a first cache line by a second processor running the program code and allowing the false sharing of the first cache line by the second processor, the false sharing of the first cache line occurring upon updating a first portion of the first cache line in the first local cache memory device by the first hardware local cache controller and subsequent updating a second portion of the first cache line in a second local cache memory device by a second hardware local cache controller.

2. The method according to claim 1, wherein other hardware local cache controllers set false sharing bits corresponding to the first cache line in other local cache memory devices when the first hardware local cache controller updates the first portion of the first cache line in the first local cache memory device.

3. The method according to claim 1, wherein the first hardware local cache controller sets a false sharing bit corresponding to the first cache line in the first local cache memory device when the second hardware local cache memory device updates the second portion of the first cache line in the first cache line in the second local cache memory device, and the second hardware local cache controller sets a false sharing bit corresponding to the first cache line in the second local cache memory device when the first hardware local cache memory device updates the first portion of the first cache line in the first local cache memory device.

4. The method according to claim 3, wherein the first hardware local cache controller and the second hardware local cache controller, in response to the plurality of processors reaching an end of the software program region with no data dependency, invalidating cache lines, in the first local cache memory device and the second local cache memory device, whose false sharing bits are set.

5. The method according to claim 1, wherein any writing to a local cache memory device is written through to a cache memory device shared by the plurality of the processors.

6. The method according to claim 1, wherein the first hardware local cache controller is prevented from setting a false sharing bit of the first local cache memory device, and the other hardware local cache controllers are prevented from invalidating cache lines in local cache memory devices whose false sharing bits are not set.

7. The method according to claim 1, wherein when the first hardware cache controller updates the first portion of the first cache line in the first local cache memory device, the first hardware local cache controller sets a false sharing bit of the first cache line in the first local cache memory device, other hardware local cache controllers set false sharing bits of the corresponding cache lines in other local cache memory devices, and there is no further communication among hardware local cache memory controllers upon a subsequent occurrence of a false sharing on the corresponding cache lines.

8. The method according to claim 1, wherein the first hardware local cache controller completes the updating the first cache line in the first local cache memory device before one or more of other hardware local cache controllers set false sharing bits of the corresponding cache lines in other local cache memory devices, and the one or more of the other hardware local cache controllers set false sharing bits of the corresponding cache lines in other local cache memory devices prior to reaching the end of the software program region with no data dependency.

9. The method according to claim 1, wherein in response to two or more processors reaching the end of the software program region with no data dependency, the first hardware local cache controller selectively invalidates one or more of cache lines whose false sharing bits are set.

10. The method according to claim 1, wherein in response to the two or more processors reaching the end of the software program region with no data dependency, the first hardware local cache controller selectively updates one or more of cache lines whose false sharing bits are set by fetching valid data from the shared cache memory device.

11. The method according to claim 1, wherein to detect the occurrence of the false sharing, the first hardware local cache controller and the second hardware local cache controller use a central directory or snooping technique.

* * * * *